United States Patent
Eggert, Jr.

[15] 3,705,705
[45] Dec. 12, 1972

[54] SEAT DECELERATION ATTENUATION APPARATUS

[72] Inventor: Walter S. Eggert, Jr., Huntingdon Valley, Pa.

[73] Assignee: The Budd Company, Philadelphia, Pa.

[22] Filed: Aug. 23, 1971

[21] Appl. No.: 173,944

[52] U.S. Cl. ................................................248/430
[51] Int. Cl. ..............................................F16m 11/20
[58] Field of Search...244/122 R; 248/399, 400, 429, 248/430; 297/216

[56] References Cited

UNITED STATES PATENTS

| | | | |
|---|---|---|---|
| 1,104,429 | 7/1914 | Lacrotte | 244/122 R |
| 2,986,199 | 5/1961 | Ferriera et al. | 248/429 X |
| 3,100,617 | 8/1963 | Radke et al. | 248/430 |
| 3,532,379 | 10/1970 | Reilly et al. | 297/216 |

*Primary Examiner*—William H. Schultz
*Attorney*—Thomas I. Davenport et al.

[57] ABSTRACT

Seat support apparatus for a vehicle equipped with independent orthogonal deceleration devices. A seat is attached to a carriage which is constrained for movement in a vertically disposed track in a frame. The frame is constrained for fore and aft movement on a rail attached to the floor. The seat is supported for relative lateral movement to the carriage; such movement being normally decelerated by lateral attenuation means. The carriage supporting the seat is restrained against vertical movement by attenuation means secured between the frame and the carriage; while fore and aft deceleration is provided by attenuation means interposed between the floor of the aircraft and the frame.

The Invention herein described was made in the course of or under a contract or subcontract thereunder with the Department of Navy.

7 Claims, 5 Drawing Figures

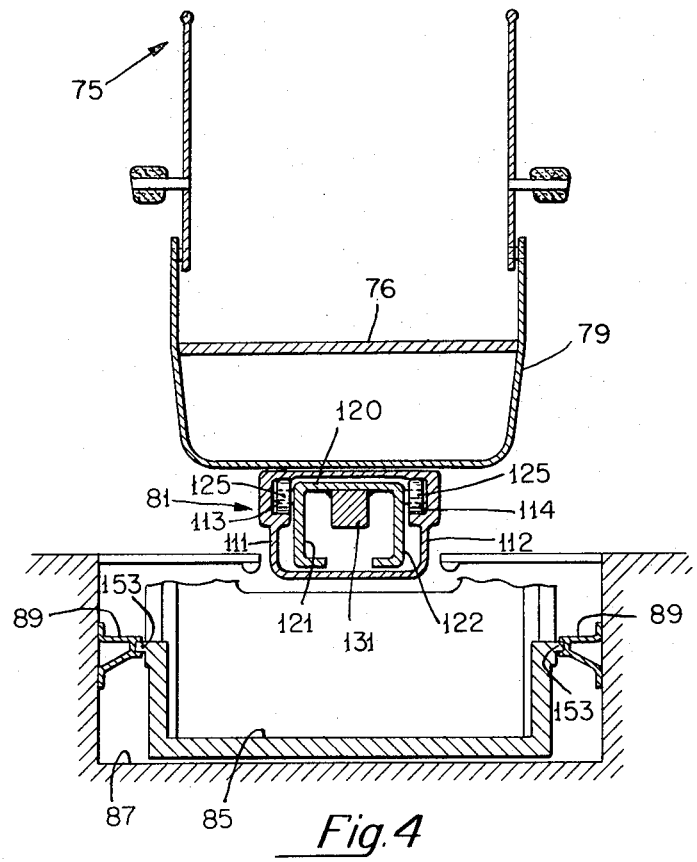
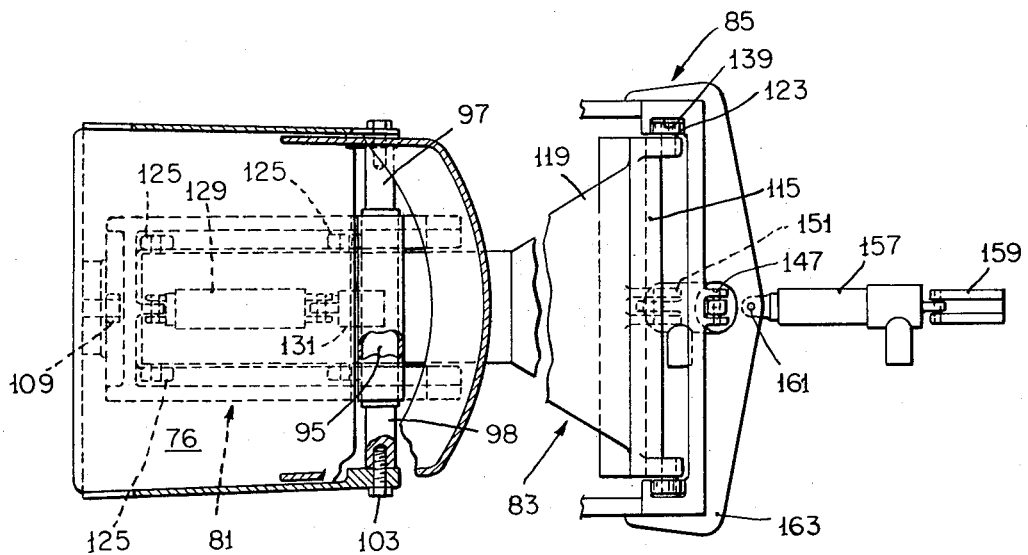

SEAT DECELERATION ATTENUATION APPARATUS

This invention relates to seat deceleration apparatus in a vehicle and more particularly to seat apparatus adapted to attenuate the impact of loads imparted to an occupant in a seat in the event of a crash of the vehicle.

Heretofore it was the practice to provide an arrangement for supporting a seat similar to a tripod in which the legs of the tripod constituted energy attenuators. In such arrangements the vertical attenuator has usually been found to be well oriented but the lateral and longitudinal attenuators because of their slope tend to couple and induce seat rotation upon impact of loads being applied along one of the axes. The rotation is induced because there is no positive constraint which causes the seat to move only along the axis.

In still other arrangements it was the practice to provide load attenuating seat apparatus yieldable only in one direction in the event of a crash while being substantially rigid in other directions. The apparatus could absorb loads applied to an occupant in this one direction but were ineffective to yield to loads applied in any of the other directions. Thus whenever loads in excess of a given magnitude were applied to the occupant through the seat, the occupant was often injured.

The present invention provides a seat for an occupant of a vehicle which is capable of absorbing a peak impact load within a given range of magnitude regardless of its direction so that the effective load imparted to the occupant is minimized to a tolerable value. To accomplish this end the seat is mounted to a carriage slide with provision to constrain movement of the seat transversely of the vehicle along a first axis laterally of the vehicle, an attenuator being interposed between the carriage and the seat to decelerate movement of the seat relative to the carriage. A frame having a track therein is provided for the carriage to constrain its movement vertically. A second attenuator is provided to decelerate motion along the track in the frame. The frame in turn is mounted for tracked movement along a third axis longitudinally of the vehicle and a third attenuator decelerates movement of the frame along said third axis.

Therefore a primary object of this invention is to provide a new and improved impact attenuating apparatus for a seat of a vehicle which avoids one or more of the disadvantages of the prior art structures.

Another important object of this invention is to provide an improved attenuating apparatus for a seat adapted to decelerate motion of the seat carrying an occupant as a result of peak loads resulting from a crash of the vehicle.

Another important object of this invention is the provision of a new and improved tri-axial energy attenuated seat having independent energy attenuation along each axis.

A still further object of this invention is the provision of a new and improved seat arrangement capable of deformation along an individual axis without causing or inducing significant deformation along other axes.

A still further object of this invention is the provision of a new and improved seat support apparatus adapted to absorb peak energy loads such that the relationship of the center of mass of the seat and its occupant to the floor mountings of the apparatus will not induce rotations or cross-couplings in the seat structure upon impact of the vehicle.

Other and further objects and advantages of the invention will be apparent when considered with the description which follows taken together with the accompanying drawing.

FIG. 4 is a vertical sectional view of the deceleration apparatus taken along the lines 4—4 of FIG. 3;

FIG. 5 is a view taken along the lines 5—5 of FIG. 3.

Figure 1:
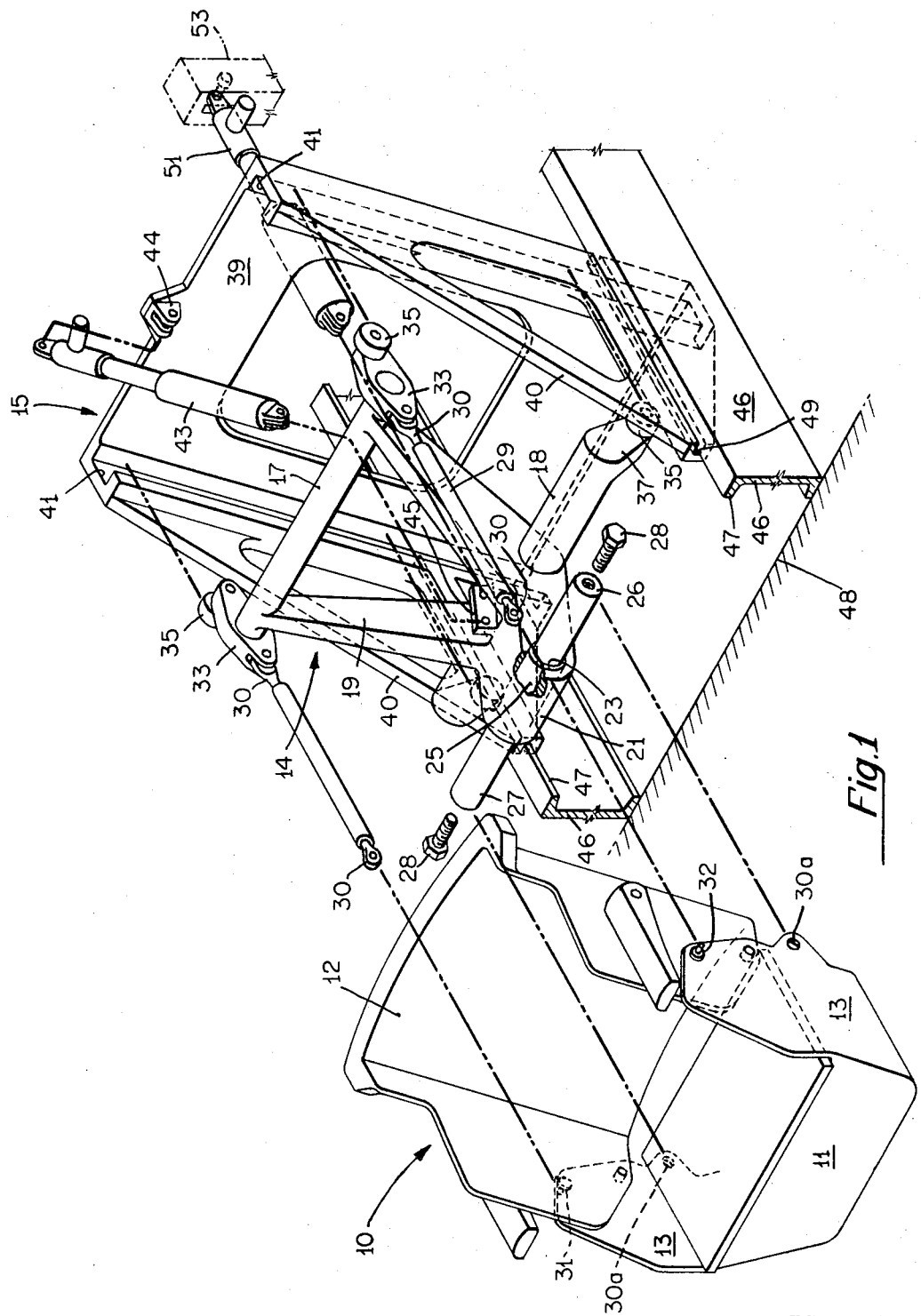
FIG. 1 is an exploded three-quarter side elevational view of various components of the seat attenuation apparatus of one form of the invention.

With reference now to the drawing, numeral 10 indicates a seat having a base portion 11 and a back portion 12. The base portion includes opposed side portions 13 to enable the seat to be supported by carriage means 14 which is mounted for tracked movement in a frame 15.

The carriage means 14 includes an upper transverse bar 17 and a lower transverse bar 18 connected by a yoke number 19 which includes a forwardly extending portion 21 having a transverse cylindrical bore 23. A lateral energy absorbing device 25 is received in the bore. The energy absorber or attenuator contemplated for use may be a type of vehicle and landing gear shock absorber for control of body and seat loads during crash. Such units may be of the class having a sliding tube enclosing a retardant such as a frictional device, hydraulic or pneumatic, viscous, or dynamic, i.e., acceleration pressure drop. Such devices may further be of the class involving plastic deformation, extrusions, torsion, or collapsible hinges. The lateral energy device 25 as presently illustrated includes opposed internally threaded end portions 26,27 which extend between the upright sidewalls 13 of the seat base 11. Bolts 28 which extend through apertures 30a in the sidewalls are received in the threaded end portions 25, 26. In order to stabilize and prevent the seat 10 from rotating about the axis of the lateral energy absorbing device 25, a pair of longitudinally disposed sway bars 29 are provided at the opposite ends of upper bar 17 and upper portions of the sidewalls 13 of the seat base 11. The forward end of each of the sway bars is provided with a universal swivel element 30 which in turn is pin-connected to its respective sidewall 13 as at 30a. The rear portions of the sway bars likewise include swivel elements 30 which are suitably secured to the forward portions of elongated fittings 33 affixed at opposite ends of the transverse bar 17. The rear portions of the fittings 33 include roller elements 35 mounted thereon. The lower transverse bar 18 of the carriage means includes downwardly and rearwardly extending arm portions 37 which also have suitably mounted thereon rollers 35.

In order to provide vertical tracked movement for the carriage means 14 the frame 15 is shown including an upright transversely extending wall portion 39 with contiguously forwardly extending wing portions 40 at its outer side margins. The wing portions each include a generally vertically inwardly disposed groove 41 into which is received the aforementioned upper and lower rollers 35 mounted on the sides of the carriage 14. A vertical energy absorber 43 is suitably pin-connected at its upper end to a lug 44 integral with the top marginal edge portion of the back plate 39 of the frame 15, while the lower end of the energy absorber is secured to the forward end of lug portion 45 integral with the central base portion of the yoke member 19. The vertical energy absorber thus serves to inhibit vertical movement of the carriage along the track elements 41.

In order to permit fore and aft horizontal movement of the assembled seat 10, carriage 14, and frame unit 15 respectively, a pair of side rails 46 is provided. The side rails in the present instance are shown as being of channel form having directed flanges 47. The side rails are mounted in spaced apart relationship on the floor 48 of the vehicle carrying the seat. The aforementioned side walls 40 of the frame 15 include grooves 49 disposed along their lower margins which extend horizontally to receive complemental tongue-flange portions 47 of the side rails 46. A longitudinal, i.e., fore and aft energy absorber 51 is secured at its forward end to the lug 47 of the previously mentioned yoke 19 while its rearward portion is suitably pin-connected to post 53 which in turn is suitably affixed to the floor structure 48 of the vehicle.

Referring now to FIGS. 2 to 5 inclusive there is illustrated a modified form of the invention. Reference numeral 75 indicates a seat assembly having a base portion 76 and a back portion 77. The base portion of the seat includes a pair of opposed sidewalls 79 and a front wall 80. The seat assembly is supported by a slide assembly 81 which is mounted for fore and aft movement on a carriage frame 83. A base frame 85 receives the carriage frame for generally vertical movement, the frame in turn being received within a floor well 87 of the vehicle and mounted for fore and aft on side rails 89.

Figure 2:
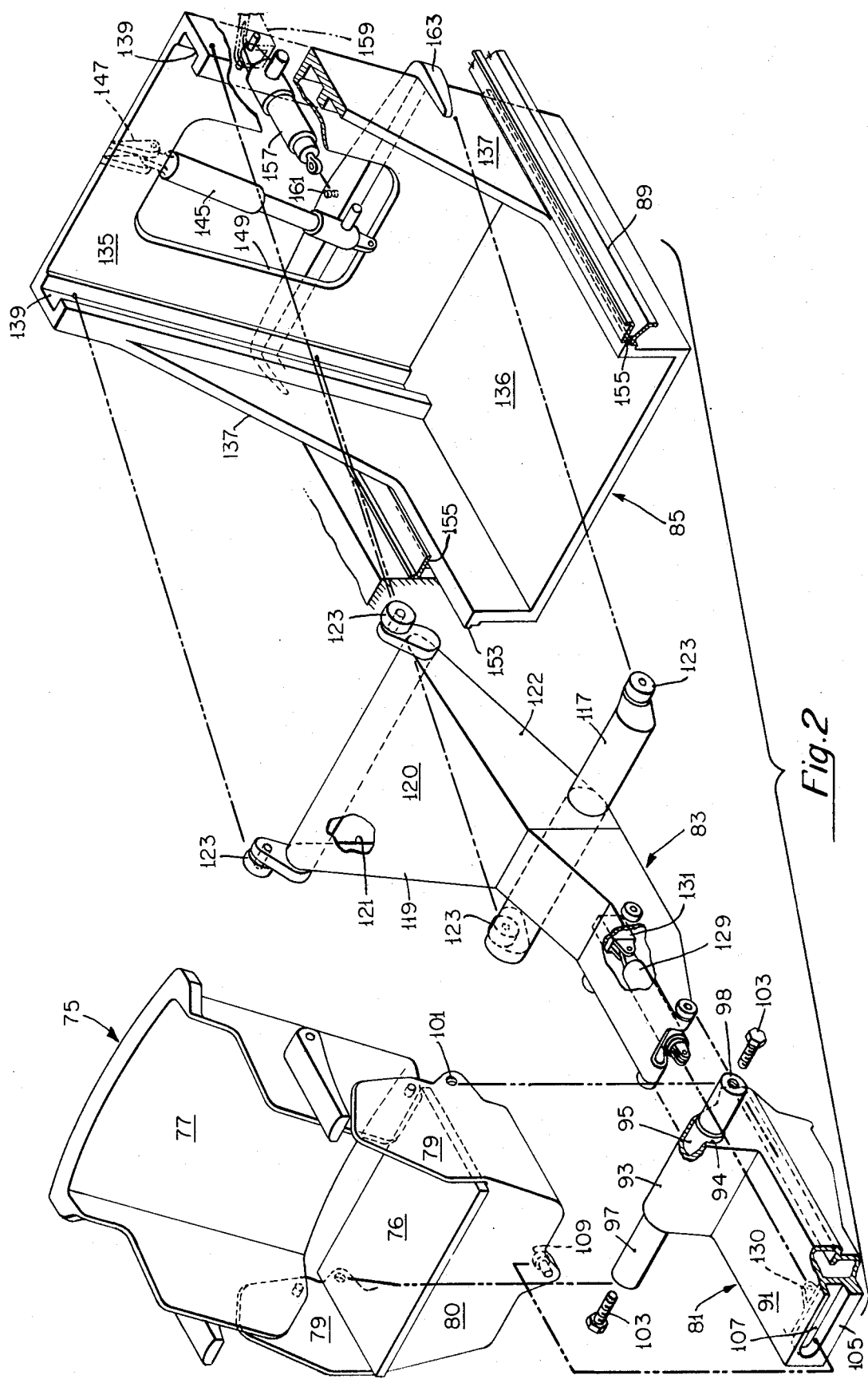
FIG. 2 is an exploded three-quarter side elevational view of various components of a modified form of seat attenuation apparatus.
Figure 3:
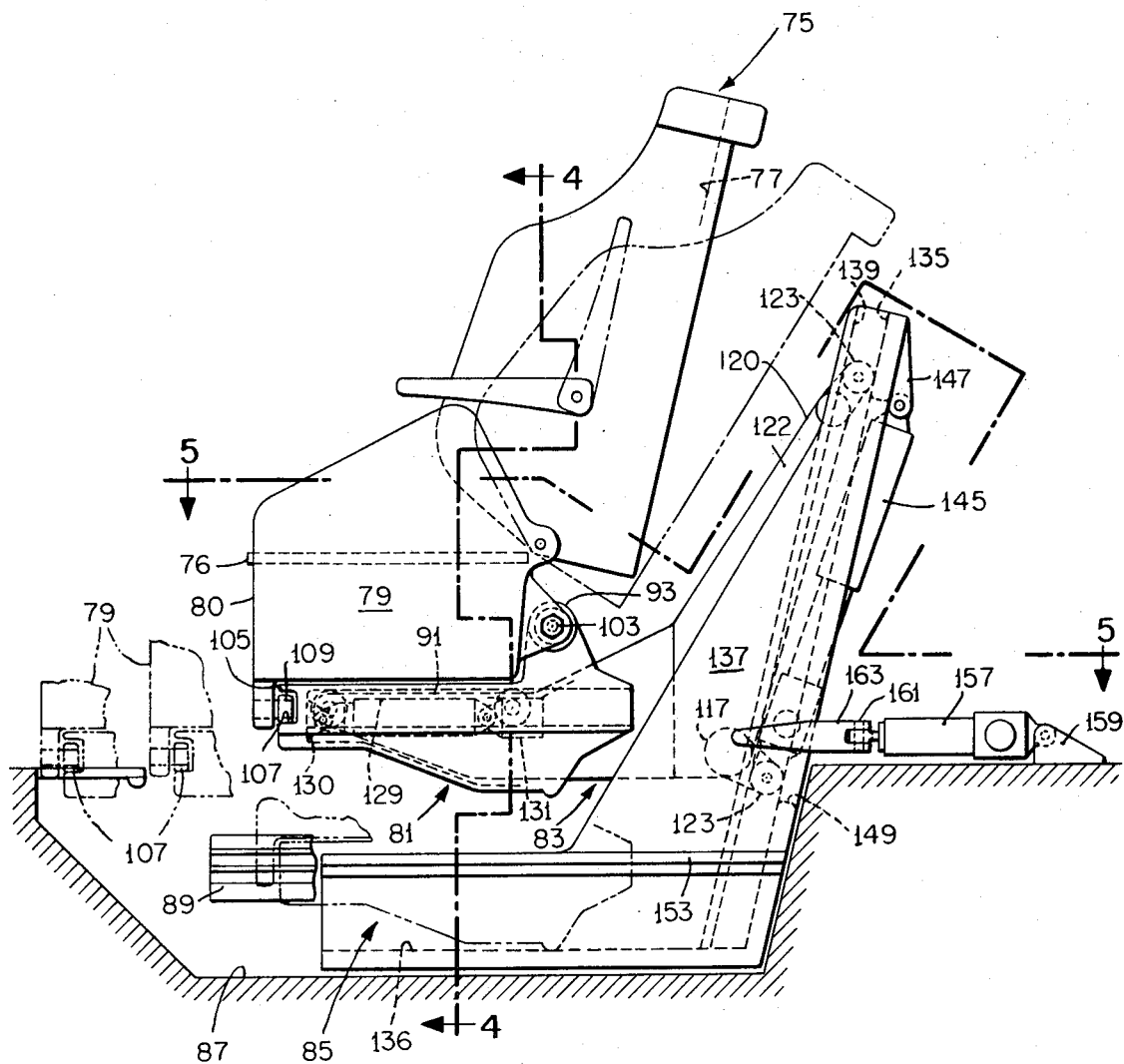
FIG. 3 is a side elevational view of the various components illustrated in FIG. 2 in their assembled relationship.

With reference now to FIGS. 2 and 4 the slide assembly 81 is shown as including a hollow rectangular sleeve portion 91 having an enlarged upwardly extending portion 93 which includes a transverse bore 94 into which is received a transverse energy absorbing device 95. The latter device includes opposite internally threaded end portions 97, 98 which extend between the sidewalls 79 of the seat base 76. The sidewalls of the seat base are apertured as at 101 to enable the passage of bolts 103 to secure the seat 75 to the lateral energy absorbing device 95. As seen in FIG. 2 the slide assembly 81 is shown as including a forward end wall 105 which is grooved as at 107 to receive a roller 109 suitably mounted for rotation to the rear inner face of front wall 80 of the seat. Lateral loads imparted to an occupant in the seat may thus be absorbed by the lateral energy absorbing device 95 resulting in a limited movement of the ends 97, 98 of the device as well as travel of the roller 109 of the seat in groove 107. The slide assembly is formed with side walls 111, 112 and which contain grooves as at 113 and 114 respectively to enable fore and aft sliding movement of the seat 10 and slide assembly 81 relative to carriage 83 in a manner to be hereinafter described.

The carriage 83 is shown as including an upper horizontal transverse bar 115 and a lower horizontal transverse bar 117 maintained in spaced relationship by a truss 119 consisting of a top plate 120 and side plates 121, 122. The opposite ends of the upper and lower bars have suitably mounted thereon rollers 123.

The sidewalls 121, 122 of the truss 119 extend forwardly of the lower horizontal bar 117 and carry on their outer faces roller elements 125. The latter roller elements are received in the aforementioned grooves 113, 114 of sidewalls 111, 112 respectively, see also FIG. 4. In order to provide energy attenuation in a fore and aft direction corresponding to the axis of the slide assembly a fore and aft energy absorbing device 129 is connected at one of its ends to lug 130 integral with the rear face of end wall 105 and at its other end to a clevis post 131 affixed to the underside of top plate 120.

With reference now to FIGS. 2 and 4 the aforementioned base frame 85 for the seat is shown as comprising a generally vertical planar back portion 135, a horizontal web portion 136 contiguous with the bottom edge portion of the planar back, and a pair of opposed side walls 137. The side walls include channel-like grooves 139 along their inner faces along the side margins of back wall 135. The grooves extend generally vertically from the top surface of horizontal web 136 to the top edge of the back plate 135. The aforementioned rollers 123 of the carriage 83 ride grooves 139 to enable up and down movement of the carriage 83 relative to the base frame 85. A vertical energy absorber 145 is suitably pin-connected at its upper end to lugs 147 projecting from the top marginal edge of the back face of plate 135 of the frame, while the lower portion of the energy absorbing device 145 passes through opening 194 in the plate and is secured at its lower end to ears 151 projecting from lower cross-bar 117 of the carriage 83. See FIGS. 2 and 5. In order to enable fore and aft horizontal movement of the base frame 85 relative to the floor 87, the sidewalls each includes a tongue portion 153 which projects outwardly from the outer faces of sidewalls 137. The tongues are received within opposed grooves 155 in oppositely disposed side rails 89. In order to inhibit fore and aft horizontal movement of the base frame 85 relative to the floor of the vehicle an additional fore and aft energy absorber 157 is suitably pin-connected to an anchor element 159 attached to the floor of the vehicle while the forward end of the absorber 157 is suitably pin-connected as at 161 to yoke member 163 which is disposed horizontally and is secured to the back surface of back plate 135 and the outer surfaces of side plates 137.

It is thus seen from the above described description that a seat attenuation apparatus is provided which is capable of absorbing the impact of a peak load regardless of its direction so that the effective load imparted to the occupant of the seat is reduced to a tolerable value and spread over a period of time. It is seen also that the seat is universally movable via vertical, lateral and longitudinal axes to thereby have freedom of movement in all directions but such movement is normally decelerated by the previously described vertical energy absorber 145, lateral energy absorber 85, and by longitudinal absorbers 129, 157. Any load imposed on the occupant is thus resolved into its rectangular components without inducing rotations or cross-couplings upon impact of the vehicle.

While there have been described what are at present considered to be the preferred embodiment of this invention, it will be obvious to those skilled in the art that various changes and modifications may be made therein without departing from the invention and it is therefore aimed in the appended claims to cover all such changes as fall within the spirit of the invention.

What is claimed is:

1. Apparatus for decelerating the movement of a body in the seat of a vehicle having a floor, said apparatus including frame means, means for constraining said frame means to movement in a fore and aft direction relative to said vehicle, carriage means, means for constraining movement of said carriage means relative to said frame means to vertical movement normal to said fore and aft direction, lateral attenuation means secured to said carriage means and supporting said seat and decelerating lateral movement of said seat relative to said carriage means, vertical attenuation means secured to said carriage means and to said vehicle for decelerating vertical movement of said seat and said carriage, and longitudinal attenuation means secured to said carriage means and to said floor for decelerating movement of said seat and said carriage longitudinally of said vehicle.

2. Apparatus as set forth in claim 1 including stabilizing means secured between said seat and said carriage means to preclude rotation of said seat relative to said lateral attenuation means.

3. Apparatus as set forth in claim 2 wherein said stabilizing means constitutes sway bars and swivel means connecting said sway bars to said seat and to said carriage means.

4. Apparatus as set forth in claim 1 wherein said means for constraining movement of said carriage means relative to said frame means includes spaced apart track means in said frame means, and roller means mounted on said carriage means and received in said track means.

5. Orthogonal deceleration apparatus for a seat in a vehicle having a floor, said apparatus including frame means, means for constraining movement of said frame means to movement in a fore and aft longitudinal direction, attenuation means interposed between said floor and said frame for decelerating movement of said frame longitudinally of said vehicle, carriage means, means for constraining movement of said carriage means relative to said frame means to a vertical direction, second attenuation means interposed between said frame means and said carriage means for decelerating movement of said carriage in said vertical direction, slide means mounted on said carriage means and constrained for movement to said fore and aft direction, third attenuation means mounted between said slide means and said carriage means for decelerating movement of said slide means in said longitudinal direction, and additional attenuation means connected to said slide means and to said seat means to decelerate movement of said seat laterally of said vehicle.

6. Apparatus as set forth in claim 5 wherein said carriage means includes a tongue portion having rollers and wherein said slide means includes a sleeve portion to accommodate said tongue portion and rollers for sliding movement.

7. Apparatus as set forth in claim 6 wherein said slide means includes portions defining a guideway transverse to the direction of movement of said slide means and wherein said seat includes roller means which are mounted for movement in said guideway.

* * * * *